US 9,299,019 B2

(12) United States Patent
Rasmussen

(10) Patent No.: US 9,299,019 B2
(45) Date of Patent: Mar. 29, 2016

(54) SYSTEMS FOR DATA COLLECTION

(75) Inventor: Matthew John Rasmussen, Shedd, OR (US)

(73) Assignee: Trimble Navigation Limited, Sunnyvale, CA (US)

(*) Notice: Subject to any disclaimer, the term of this patent is extended or adjusted under 35 U.S.C. 154(b) by 163 days.

(21) Appl. No.: 13/419,442

(22) Filed: Mar. 14, 2012

(65) Prior Publication Data
US 2013/0241698 A1 Sep. 19, 2013

(51) Int. Cl.
| H04Q 5/22 | (2006.01) |
| G06K 17/00 | (2006.01) |
| G06K 19/07 | (2006.01) |
| G01S 5/00 | (2006.01) |
| G06K 19/06 | (2006.01) |
| G01C 15/02 | (2006.01) |

(52) U.S. Cl.
CPC ........ G06K 17/0022 (2013.01); G06K 19/0716 (2013.01); G01C 15/02 (2013.01); G01S 5/0018 (2013.01); G06K 19/06 (2013.01)

(58) Field of Classification Search
USPC ...................................................... 340/568.1
See application file for complete search history.

(56) References Cited

U.S. PATENT DOCUMENTS

| 4,343,550 | A | * | 8/1982 | Buckley | G01C 15/02 248/480 |
| 5,825,298 | A | * | 10/1998 | Walter | E01F 9/005 324/329 |
| 6,683,693 | B1 | * | 1/2004 | O Tsuka | G01C 15/02 356/620 |
| 7,664,530 | B2 | * | 2/2010 | Skelton | G01C 15/00 379/1.03 |
| 7,685,961 | B2 | * | 3/2010 | Truax | G01C 15/04 116/209 |
| 7,861,434 | B2 | | 1/2011 | Knudsen | |
| 7,890,235 | B2 | | 2/2011 | Self et al. | |
| 7,966,740 | B2 | | 6/2011 | Knudsen | |
| 8,004,397 | B2 | * | 8/2011 | Forrest | G06Q 10/06 340/505 |
| 8,109,006 | B2 | | 2/2012 | Knudsen | |
| 8,289,167 | B2 | * | 10/2012 | Bauchot | G01C 15/04 340/568.2 |
| 8,500,005 | B2 | * | 8/2013 | Amor | G01C 15/02 235/375 |
| 8,699,005 | B2 | * | 4/2014 | Likholyot | G01S 17/42 356/3.01 |
| 2002/0008621 | A1 | * | 1/2002 | Barritz | G01S 5/00 340/572.1 |
| 2002/0091491 | A1 | * | 7/2002 | Jackson | G05B 19/4065 702/56 |
| 2003/0182259 | A1 | * | 9/2003 | Pickett | A01B 79/005 |
| 2003/0234293 | A1 | * | 12/2003 | Sauve | G01C 15/02 235/492 |
| 2004/0177032 | A1 | * | 9/2004 | Bradley | G06K 17/00 705/38 |

(Continued)

OTHER PUBLICATIONS

International Application No. PCT/US20131027691, International Search Report and Written Opinion of the International Searching Authority, date of mailing Apr. 30, 2013, by ISA/US Authorized officer Lee W. Young.

Primary Examiner — Jennifer Mehmood
Assistant Examiner — Rufus Point
(74) Attorney, Agent, or Firm — Kilpatrick Townsend & Stockton LLP

(57) ABSTRACT

A method for improving a data collection process is provided. The method comprises: (A) providing at least one Data Generation device, whereas each Data Generation device is configured to obtain a set of data; (B) attaching an ID tag to at least one Data Generation device; whereas each ID tag includes an externally readable code; and (C) employing a Data Collection device having an ID tag reader configured to identify at least one Data Generation device by reading the externally readable code corresponding to its ID tag; whereas the Data Collection device is located within the pre-determined range from the Data Generation device; and whereas the Data Generation device is configured to transmit a set of data to the Data Collection device.

10 Claims, 4 Drawing Sheets

(56) References Cited

U.S. PATENT DOCUMENTS

| | | | |
|---|---|---|---|
| 2005/0143883 A1* | 6/2005 | Yamagiwa | G06Q 10/06 701/29.6 |
| 2005/0203681 A1* | 9/2005 | Minor, Jr. | H04W 4/005 701/23 |
| 2006/0012480 A1* | 1/2006 | Klowak | G01S 13/825 340/572.1 |
| 2007/0288159 A1* | 12/2007 | Skelton | G01C 15/00 455/556.2 |
| 2008/0011822 A1 | 1/2008 | Ackley et al. | |
| 2008/0018429 A1* | 1/2008 | Kudoh | G01S 15/74 340/10.1 |
| 2008/0042840 A1* | 2/2008 | Christopher | G06Q 30/02 340/572.1 |
| 2008/0084332 A1* | 4/2008 | Ritter | G06Q 10/06 340/989 |
| 2008/0084333 A1* | 4/2008 | Forrest | G06Q 10/06 340/989 |
| 2008/0086391 A1* | 4/2008 | Maynard | G06Q 10/087 705/28 |
| 2008/0086508 A1 | 4/2008 | Ballew | |
| 2008/0150696 A1 | 6/2008 | Bolander et al. | |
| 2009/0140852 A1* | 6/2009 | Stolarczyk | H01Q 1/04 340/539.13 |
| 2009/0174550 A1* | 7/2009 | Aninye | G07C 9/00111 340/539.13 |
| 2009/0183966 A1* | 7/2009 | King | G06Q 50/30 194/217 |
| 2009/0189804 A1* | 7/2009 | Ashjaee | G01S 19/14 342/357.27 |
| 2009/0201154 A1* | 8/2009 | Bauchot | G01C 15/04 340/568.1 |
| 2009/0256693 A1* | 10/2009 | Brinton | G08G 1/20 340/439 |
| 2009/0262604 A1* | 10/2009 | Funada | G01S 5/30 367/127 |
| 2010/0088031 A1* | 4/2010 | Nielsen | G06Q 10/06 702/5 |
| 2010/0185549 A1* | 7/2010 | York | G06F 3/04883 705/301 |
| 2010/0231389 A1* | 9/2010 | Zank | G01V 15/00 340/572.8 |
| 2012/0310529 A1* | 12/2012 | Hamilton | G01C 21/32 701/433 |
| 2013/0016214 A1* | 1/2013 | Dlott | G06Q 30/02 348/143 |
| 2013/0060520 A1* | 3/2013 | Amor | G01S 5/0018 702/154 |
| 2013/0241698 A1* | 9/2013 | Rasmussen | G06K 19/0716 340/10.1 |

\* cited by examiner

SYSTEMS FOR DATA COLLECTION

TECHNICAL FIELD

The technology relates to the utilization of RFID tags, and more specifically, to the usage of RFID in improving data collection processes, particularly for location/position data.

BACKGROUND OF THE TECHNOLOGY

We will focus on three types of devices: a Data Generation device, a Data Collection device; and a Data Receiving device.

Data can be collected by using a Data Collection device selected, for instance, from the following Data Generation devices: Trimble Survey Controller, Trimble Series 4000 and R/5000 receivers, Trimble 3300, Trimble 3600 (Elta, Geodimeter, TDS), Trimble 5600 (Elia, Geodimeter, TDS). Trimble Digital Fieldbook, DiNi Digital Level, Trimble Survey Pro, All Mapping and GIS Data Collection devices, Nikon total stations (serial connections), Trimble Business Center, etc. The data collected by the Data Collection device can be downloaded to a PC. The data being collected generally relates to location or position information as may pertain to objects, land formations, buildings, and the like, and may be either surveyor data or mapping and Geographic Information Systems data. But any other type of data may be collected by alternate equipment and receive the same benefit of embodiments of the invention as well.

An operator can then import the data from PC into Data Receiving devices like: Trimble Geomatics Office™; Trimble Total Control™, Terramodel®; Trimble Business Center, GNSS Pathfinder® Office software, Trimble Link™, Spectra Precision Survey Office (the Spectra Precision branded office software built from Trimble Business Center), or to the GNSS Analyst™ extension for ESRI ArcGIS Desktop software. These devices with relevant ancillary software may perform additional operations on the data, for the benefit of a subsequent user.

Setup of communication and operation parameters between a Data Collection device and a Data Generation device requires a certain level of input, each time, by the end user.

However, the currently employed process of using a Data Collection device is cumbersome and inefficient—especially if the end user owns more than one of each devices (as may occur in a surveying corporation). There may be many different kinds of actions, or functions, to take to transmit the data from the variety of Data Generation Devices to a similar variety of Data Collection Devices. The data may be formatted differently from a first Data Generation Device to a second device. Performing suitable setup steps to properly receive the data is time-consuming and prone to error.

One solution to this problem is to identify at least one Data Generation device by using an ID tag so that the Data Collection device can read the ID tag and identify all the necessary parameters for effecting proper data transmission of the data collected from a particular Data Generation device.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for improving a data collection process is provided. The method comprises: (A) providing at least one Data Generation device, whereas each Data Generation device is configured to obtain a set of data.

The method further comprises: (B) attaching an ID tag to at least one Data Generation device; whereas each ID tag includes an externally readable code.

The method further comprises: (C) employing a Data Collection device having an ID tag reader configured to identify at least one Data Generation device by reading the externally readable code corresponding to and contained in its ID tag and whereas the Data Generation device is configured to transmit a set of data to the Data Collection device.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
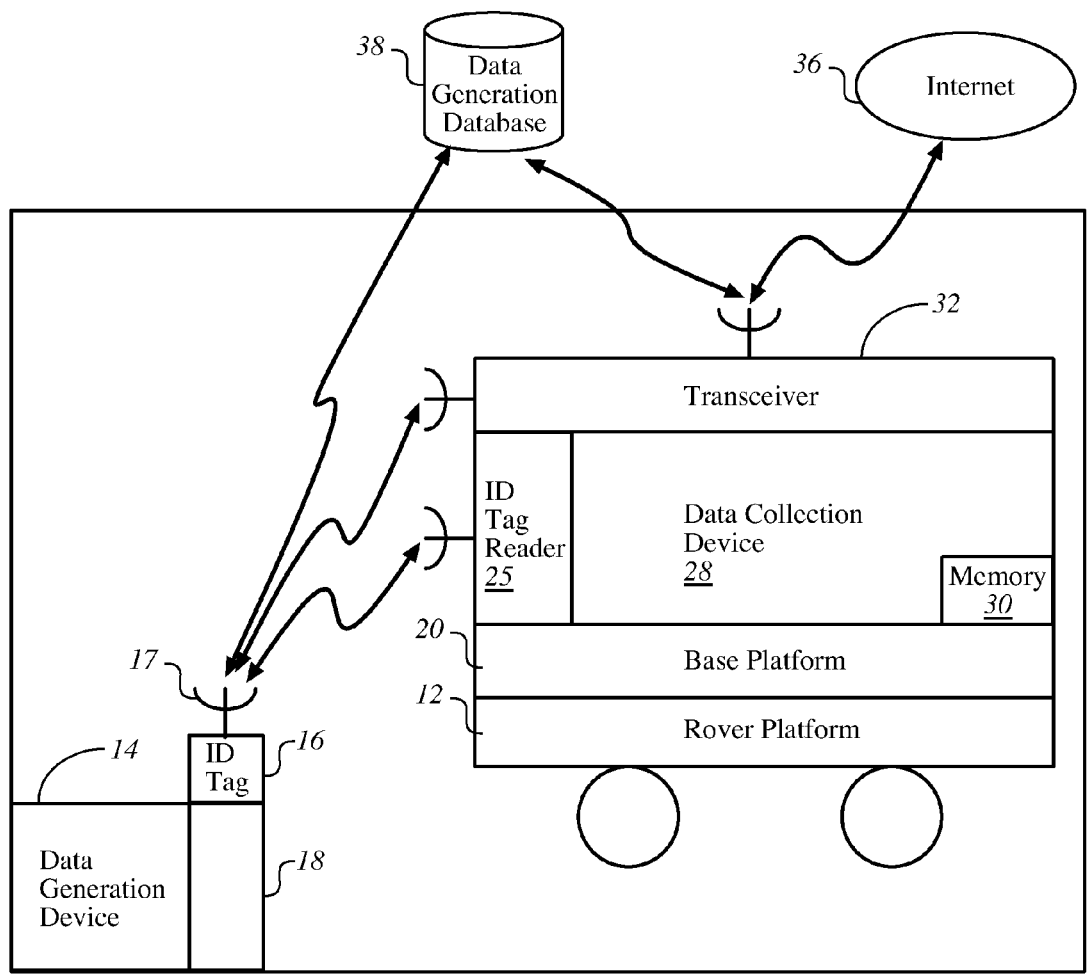
FIG. 1 illustrates a block diagram of an apparatus of the present technology for improving a data collection process comprising at least one Data Generation device, at least one ID tag attached to at least one Data Generation device, and a Data Collection device having an ID tag reader.

FIG. 1 illustrates an apparatus 10 configured to improve a data collection process in accordance with an embodiment of the present technology.

In an embodiment of the present technology, the apparatus 10 comprises at least one Data Generation device 14. A Data Generation device 14 is configured to obtain a set of data.

In an embodiment of the present technology, at least one ID tag 16 is attached to at least one Data Generation device 14.

In an embodiment of the present technology, each ID tag 16 includes an externally readable code.

In an embodiment of the present technology, the apparatus 10 further comprises at least one Data Collection device 28 having an ID tag reader 25 coupled to a wireless receiver 24.

In an embodiment of the present technology, the Data Collection device 28 is configured to identify at least one Data Generation device 14 by reading the externally readable code corresponding to the ID tag 16.

In an embodiment of the present technology, the Data Collection device 28 is located far away from the Data Generation device 14. In another embodiment of the present technology, the Data Collection device 28 is located within predetermined range from the Data Generation device 14. The Data Generation device 14 is configured to transmit a set of data to the Data Collection device 28.

Referring still to FIG. 1, in an embodiment of the present technology, the Data Generation device 14 is selected from the group consisting of a Global Navigation Satellite System (GNSS) receiver, a Total Station, a Digital Level, and a Laser Level.

In an embodiment of the present technology, the Data Generation device 14 comprising a Global Navigational Satellite System (GNSS) receiver is selected from the group consisting of a GPS receiver; a GLONASS receiver; a combined GPS/GLONASS receiver; a GALILEO receiver; and a BeiDou (COMPASS) receiver.

In an embodiment of the present technology, the Data Generation device 14 comprising a Total Station uses a laser beam (not shown) to determine its target's precise position coordinates.

In an embodiment of the present technology, the Data Generation device 14 comprising a Total Station is selected from the group consisting of: a Trimble ATS Construction Total Station; a Trimble® S6 DR Plus Total Station; a TRIMBLE S8 Total Station; and a Spectra Precision Focus 30 Robotic Total Station.

In an embodiment of the present technology, the Data Generation device 14 comprises the Digital Level which is a digital height measurement sensor configured for fast and accurate height determination. For example, the Trimble DiNi can be used for applications such as precise leveling of flat and sloping surfaces, establishing the vertical component of grade and ground profiles, subsidence monitoring, and establishing the vertical component of control networks.

In an embodiment of the present technology, the Data Generation device 14 comprises a Laser Level. For example, the Johnson Level GreenBrite® Technology can be employed to obtain very fast (within seconds) level horizontal and vertical lines even when on uneven ground.

Referring still to FIG. 1, in an embodiment of the present technology, the Data Generation device 14 comprises a construction survey Data Generation device.

Referring still to FIG. 1, in an embodiment of the present technology construction survey Data Generation device can be used for generation of a plat. A plat in the U.S. is a map, drawn to scale, showing the divisions of a piece of land graphically.

A plat of Alcoholic Beverage Survey shows the proposed location of an establishment selling and/or serving alcoholic beverages and the distances to certain structures (private residence, church, nursing home, public library, hospital, school ground or college campus) along the nearest practical street route.

An ALTA survey is performed for the purpose of supplying a title company and lender with a survey and location data necessary for the issuing of title and/or mortgage insurance. ALTA stands for American Land Title Association. Specifications for this type of survey include (but are not limited to) determining property lines, location of improvements, identifying all easements, utilities and other conditions affecting the property. The ALTA survey is most often performed on commercial properties.

"As-built" surveys are surveys of existing facilities, such as shopping centers, schools, factories, etc. These surveys depict the location of all existing improvements on a site, which can include buildings, parking areas, utilities, storm drainage systems, sewer disposal systems, and any other features.

"Billboard Location" survey is a surveyor's certification showing the exact location of the billboard sign. The outline of the pole and extreme limits of the billboard should be clearly indicated at the time of application, prior to inspection of the site. Billboard should be in compliance with all local laws, ordinances or regulations.

A boundary survey establishes the true property corners and property lines of a parcel of land. Boundary surveys are typically performed to obtain building permits, to resolve property disputes, and for erecting fences. Easement lines can also be located with this type of survey, if requested. It is always good to know exactly where your land boundaries are.

A Construction layout survey includes the layout of buildings, curbs, storm and sewer drainage systems, and other site features. This could also include staking of building corners, staking the location and elevation of a new sewer line and staking the location and elevation of any type of concrete to be poured (roads, driveways, etc.)

Construction surveying is the translation of construction plans into physical points on the ground that can be used as a basis for the actual construction. The results of construction surveying are seen in most any urban, suburban, or rural setting. Almost any roadway, building, or other man-made improvement likely had some amount of construction surveying involved. Construction surveying provides not only the horizontal location of new improvements, but also the vertical information required to ensure that surfaces drain or pipes flow as required.

The elevation certificate is an important administrative tool of the National Flood Insurance Program. It is used to provide elevation information to ensure compliance with community floodplain management ordinances to determine the proper insurance premium rate. The field work necessary to complete an elevation certificate involves determination of the actual elevation(s) of the structure and the elevation of the adjacent grade. One would need an elevation certificate if he (she) is purchasing a home in a flood zone and need to purchase the necessary flood insurance as well.

The Georgia Erosion and Sediment Control Act of 1975 included a groundbreaking mandatory certification program for all individuals involved in land disturbing activities in Georgia. Eligible professionals include: engineering, architecture, landscape architecture, forestry, geology, or land surveying. Erosion and sedimentation control is governed by a local governing authority and may vary between City, County, or EPD (Environmental Protection Division). It is recommended that one would consult with a licensed land surveyor to ensure a proper erosion and sediment control plan in compliance with the local governing authorities.

A final survey is typically used by title companies and mortgage lenders to obtain proof that the major improvements on the property are free of encroachments onto neighboring properties or into recorded easements. Final surveys do not establish property corners or property lines and may not be used for building purposes. They are most often done on newly constructed homes. Obtaining a survey ensures one's protection in any real estate transaction. A final survey discloses exactly what portion of property is being purchased and everything on that property. Many real estate transactions have some type of problem. These problems can be minor; a fence is over the property line or much more serious; a driveway, pool, or deck is over a property line, the deed outlining the parcel of property is incorrect, the house is in a flood zone, etc. Some problems are irreparable. If a driveway is completely off the property, the buyer has no ingress or egress to the home. If the house is over the property line, nothing can be done to correct the situation unless the buyer negotiates with the neighbor to buy a piece of their property. It's amazing how many innocent-looking situations can turn into nightmares when buyers don't take the proper precautions to check property boundaries. So if one were to purchase a property without taking the proper precautions, one could be buying all of the seller's headaches, perhaps at a premium price.

Subdivision surveys are used for subdividing a tract of land into smaller parcels, showing documentation and survey data on a map, in conformance with local ordinances. This would include the sizing and location of lots (set-backs & easements) and streets depending on the city or county zoning ordinances. These surveys are required by developers before seeking approval from the city or county commissioners. When developing a parcel of land, the developer requires a wide range of surveys. One would need a boundary survey of the subdivision before planning even begins to know the actual boundaries of the subdivision. Sometimes the mortgage companies and financing institutions will require an ALTA survey to minimize their risks before the sale of the land to the developer. The developer's consultants require a topographic survey, or aerial mapping of the site if it's large enough, to aid them in the planning and engineering of the site. The consultants may need other surveys as necessary to complete their plans. The government reviewing staff requires a survey to be submitted as part of the sketch and preliminary plan submittals, and the government approving board requires a subdivision plat prepared by a licensed surveyor before final approval of the subdivision. Once construction begins, the contractors and engineers will need construction staking of the engineering plans in the field. Furthermore, the approving government will require the setting of monuments on the corner of each individual lot before its sale.

A topographic survey, also known as a land survey or a ground survey, shows the shape of the land. It uses contour lines, a line that represents a specific elevation measured from Mean Sea Level, to display the three dimensional features of the property onto a two dimensional surface. A topographic survey includes both natural and man-made features. It is common to show hills, streams, lakes, and vegetation along with major buildings, fences, roads, transmission lines, and property boundaries. The difference between a topographic survey and it's cousin, the topographic map, is that a survey shows more detail for a smaller area than a map. A topographic survey has a variety of uses including planning and zoning, site layout, engineering and architectural design, and construction.

A tree survey can clarify the positioning of trees on one's property. For a single lot or for commercial construction a surveyor will check with the city or county Planning and/or Development Department to see what the ordinance may be regarding removal of tree(s). Some ordinances may be complex but are useful in cities that are rapidly growing.

Referring still to FIG. 1, in an embodiment of the present technology, the Data generation Device 14 further comprises an agricultural Data Generation device utilized in the Precision Agriculture.

From an agronomic perspective, precision agriculture is defined as the application of technologies and principles to manage time and location variability associated with all aspects of agricultural production for the purpose of improving crop performance, profitability and environmental quality, and operations. An easier way to define the goal of precision agriculture as the process of putting the right thing, in the right amount, in the right place, at the right time.

Trimble precision agriculture products, software, and solutions can assist farmers throughout every step of their farming process—beginning with land preparation and throughout the planting, nutrient and pest management, and harvesting phases of a crop cycle. Indeed, countless university studies and agronomic research have proven that efficiencies improve when precision agriculture is added to a farming operation.

By adding a Trimble Field-iQ Crop input control system and an FmX integrated display or CfX-750 display to a tractor, a farmer can gauge where he has already applied nitrogen in his field in order to eliminate over application. By adding a prescription map and farm Works Software® solutions, a farmer can vary the amount of nitrogen that he applies on his field in real-time. This adds up to less time spent in the field, a more effective use of nitrogen, and greater crop yields.

Referring still to FIG. 1, in an embodiment of the present technology, the Data generation Device 14 further comprises a two-man conventional land surveying system, Referring still to FIG. 1, in an embodiment of the present technology, the Data generation Device 14 further comprises a conventional robotic system.

Referring still to FIG. 1, in an embodiment of the present technology, the Data generation Device 14 further comprises a Real Time Kinematic GNSS system including a stationary Base receiver and a mobile Rover receiver.

In this embodiment of the present technology, whereas the Data generation Device 14 of FIG. 1 comprises a Real Time Kinematic GNSS system including a stationary Base receiver and a mobile Rover receiver, a list of Correction formats comprises: CMR, CMR Plus, CMRx, RTCM 2.1, RTCM 2.2, RTCM 2.3, RTCM 3.0, RTCM 3.1 Net, ATOM, ATOM Compact. The first three are Trimble Proprietary, the RTCM formats are industry standards; the ATOM formats are Ashtech proprietary formats.

In this embodiment of the present technology, whereas the Data generation Device 14 of FIG. 1 comprises a Real Time Kinematic GNSS system including a stationary Base receiver and a mobile Rover receiver, a list of Radio transmission protocol formats includes: Transparent EOT/EOC and Packet Switched, TRIMTALK 450s, TRIMMARK II/IIc, TRIMMARK 3, and SATEL. Radio Modulation Type: GMSK, 4FSK.

In this embodiment of the present technology, whereas the Data generation Device 14 of FIG. 1 comprises a Real Time Kinematic GNSS system including a stationary Base receiver and a mobile Rover receiver, the Radio Frequency bandwidth comprises 12.5 kHz or 25 kHz.

In this embodiment of the present technology, whereas the Data generation Device 14 of FIG. 1 comprises a Real Time Kinematic GNSS system including a stationary Base receiver and a mobile Rover receiver, Over the air transmission baud rates, (bps) include: 4800, 9600, 19200, and 38400.

In this embodiment of the present technology, whereas the Data generation Device 14 of FIG. 1 comprises a Real Time Kinematic GNSS system including a stationary Base receiver and a mobile Rover receiver, the Radio settings must match for Base Corrections to reach the Rover receiver and allow RTK data collection to take place. These settings are to be stored in an RF chip for an instant transmission.

Referring still to FIG. 1, in an embodiment of the present technology, the Data generation Device 14 further comprises a Virtual Reference Station surveying system.

Referring still to FIG. 1, in an embodiment of the present technology, the Data generation Device 14 further includes a memory block 18 configured to store a set of internal data related to the Data Generation device 14.

In an embodiment of the present technology, the set of internal data is selected from the group consisting of a precision of the Data Generation device, an accuracy of the Data Generation device, a warranty data for the Data Generation device, a service record data for the Data Generation device, an adjustment data for the Data Generation device, and a radio type data for the Data Generation device.

Referring still to FIG. 1, in an embodiment of the present technology, the apparatus 10 further comprises a Data Generation database 39 configured to store a set of internal data related to at least one Data Generation device 14 having an externally readable code.

Referring still to FIG. 1, in an embodiment of the present technology, the ID tag 16 is selected from the group consisting of an RFID tag, a low power RFID tag, a barcode, an infra-red tag, and an ultra sound tag.

Referring still to FIG. 1, in an embodiment of the present technology, the ID tag 16 can be implemented by using Radio-frequency identification (RFID) technology that uses communication through the use of radio waves to exchange data between a reader and an electronic tag attached to an object, for the purpose of identification and tracking.

It is possible in the near future, RFID technology will continue to proliferate in our daily lives the way that bar code technology did over the forty years leading up to the turn of the 21st century bringing unobtrusive but remarkable changes when it was new.

RFID makes it possible to give each product in a grocery store its own unique identifying number, to provide assets, people, work in process, medical devices etc. all with individual unique identifiers—like the license plate on a car but for every item in the world. This is a vast improvement over paper and pencil tracking or bar code tracking that has been used since the 1970s. With bar codes, it is only possible to identify the brand and type of package in a grocery store, for instance.

Furthermore, passive RFID tags (those without a battery) can be read if passed within close enough proximity to an RFID reader. It is not necessary to "show" them to it, as with a bar code. In other words it does not require line of sight to "see" an RFID tag, the tag can be read inside a case, carton, box or other container, and unlike barcodes RFID tags can be read hundreds at a time. Bar codes can only read one at a time.

Some RFID tags can be read from several meters away and beyond the line of sight of the reader. The application of bulk reading enables an almost simultaneous reading of tags.

Radio-frequency identification involves the hardware known as interrogators (also known as readers), and tags (also known as labels), as well as RFID software or RFID middleware. The novel RFID tags are selected from the group consisting of: a High Frequency (HF) RFID tag; and an Ultra High Frequency (UHF) RFID tag.

Most RFID tags 16 contain at least two parts: one is an integrated circuit for storing and processing information, modulating and demodulating a radio-frequency (RF) signal, and other specialized functions; the other is an antenna 17 for receiving and transmitting the RF signal.

RFID can be either passive (using no battery), active (with an on-board battery that always broadcasts or beacons its signal) or battery assisted passive "BAP" which has a small battery on board that is activated when in the presence of an RFID reader. Passive tags in 2011 start at $0.05 each and for special tags meant to be mounted on metal, or withstand gamma sterilization go up to $5. Active tags for tracking containers, medical assets, or monitoring environmental conditions in data centers all start at $50 and can go up over $100 each. BAP tags are in the $3-10 range and also have sensor capability like temperature and humidity.

In an embodiment of the present technology, the RFID tag 16 includes the identification data and the position coordinates data of the Data Generation Device 14.

In an embodiment of the present technology, the ID tag 16 is implemented by using a combination of an RFID tag and an infra-red tag. The combination of active RFID tags and infrared technology enables the system to work in data environment that have both open and closed Data Generation Devices. In this scenario, the short range of infrared signal is an advantage. Indeed, the ID tag Reader 25 of the Data Collection Device 28 reads only transmissions sent by the closest infrared emitter, which eliminates the possibility of a tag reading an infrared signal emanating from an adjacent Data Generation Device.

In an embodiment of the present technology, the ID tag 16 is implemented by using an ultra sound tag.

For example, the PC-Detector from Sonitor Technologies uses ultrasound indoor positioning and real time location systems (RTLS) technology to automatically track the real time location of patients and moveable hospital equipment. The RTLS solution makes the Sonitor ultrasound tag signal detectable by computers not already equipped with the hardware and sound processing capabilities that are required to pinpoint indoor positioning system tags. By leveraging existing computer hardware and LAN connectivity, mobile computing systems such as tablet PCs, computer/medication carts, and other point-of-care devices can track the tags with reliable 100 percent room-level and bed-level location accuracy. Sonitor Technologies Inc. is located in Largo, Fla.

Referring still to FIG. 1, in an embodiment of the present technology, the ID tag 16 includes an externally readable code selected from the group consisting of: a radio code transmitted on a specific frequency, a radio code transmitted on a specific frequency periodically, a radio code transmitted on a specific frequency aperiodically, an infrared code, an infrared code transmitted on a specific frequency periodically, an infrared code transmitted on a specific frequency aperiodically, an ultrasound transmitted on a specific frequency, an ultrasound transmitted on a specific frequency periodically, and an ultrasound transmitted on a specific frequency aperiodically.

Referring still to FIG. 1, in an embodiment of the present technology, the Data Collection device 28 further comprises a memory block 30 configured to store an access code to the Data Generation database 38, an ID tag reader 25 configured to read the ID tag 16 to properly identify the Data Generation Device that is targeted for data collection, and a wireless transceiver 32 configured to wirelessly communicate with at least one targeted Data Generation device 14 to obtain the set of data from the targeted Data Generation device 14. The wireless transceiver 32 is also configured to wirelessly communicate with the Data Generation database 38.

Referring still to FIG. 1, in an embodiment of the present technology, the wireless transceiver 32 is also configured to wirelessly access Internet 36 to post a set of data collected by the Data Generation device 14.

Referring still to FIG. 1, in an embodiment of the present technology, the Data Collection device 28 can be placed on a Base platform 11, or on a Rover platform 12.

Referring still to FIG. 1, in an embodiment of the present technology, the ID tag reader 25 is selected from the group consisting of: an RFID tag reader, an Infrared tag reader, and an Ultra Sound tag reader.

In an embodiment of the present technology the RFID reader 25 can be implemented by using ThingMagic® Mercury6 (M6) 4-port, multiprotocol RFID reader.

Depending on mobility, RFID readers 25 are classified into two different types: fixed RFID and mobile RFID. If the reader reads tags in a stationary position, it is called fixed RFID. These fixed readers are set up specific interrogation zones and create a "bubble" of RF energy that can be tightly controlled if the physics is well engineered. This allows a very definitive reading area for when tags go in and out of the interrogation zone.

In an embodiment of the present technology, if ID tag 16 is implemented by using a passive RFID tag 16 (without a battery), it can be read if passed within close enough proximity to the RFID reader 25. It is not necessary to "show" them to it, as with a bar code. In other words it does not require line of sight to "see" an RFID tag, the tag can be read inside a case, carton, box or other container, and unlike barcodes RFID tags can be read hundreds at a time. Bar codes can only read one at a time.

Some RFID tags 16 can be read from several meters away and beyond the line of sight of the reader. The application of bulk reading enables an almost simultaneous reading of tags.

In an embodiment of the present technology, the Infra Red (IR) tag reader 25 can be implemented by using tag return signal generation using a light source to return a signal from the IR tag 16 to the tag reader 25. A modulated light signal could be produced by turning on and off a small infrared LED using short current pulses.

In an embodiment of the present technology, the Infra Red (IR) tag reader 25 can be implemented by using a light shutter to modulate the light striking the IR tag reader 25. Some ferroelectric devices, which require low power and behave like liquid crystal displays, could be placed in front of a plastic corner cube type reflective surface. A corner cube reflector has the unique property that it will send light back to the source in a parallel path. Such reflectors are often used on street signs, bicycle reflectors and on reflective clothing. When the ferroelectric device is turned on, light would be allowed to pass through the device and would then bounce off the reflective material, sending the light back to the source. When the ferroelectric device is turned off, light would not reach the reflective material and would therefore be adsorbed. Some ferroelectric devices have been used for high speed video displays so they could allow high data rates. Texas Instruments also has perfected arrays of tiny mirrors that can be moved using electrostatic methods to produce a light modulator. The beauty of the optical reflective method is that the level of light reflected back to a reader would be proportional to the amount of light striking the OPID tag. The approach might allow the tag read range to be extended to hundreds of feet or perhaps even 1 miles.

In an embodiment of the present technology, the Ultra Sound tag reader 25 can be implemented by using Sonitor's ultrasound technology.

Figure 2:
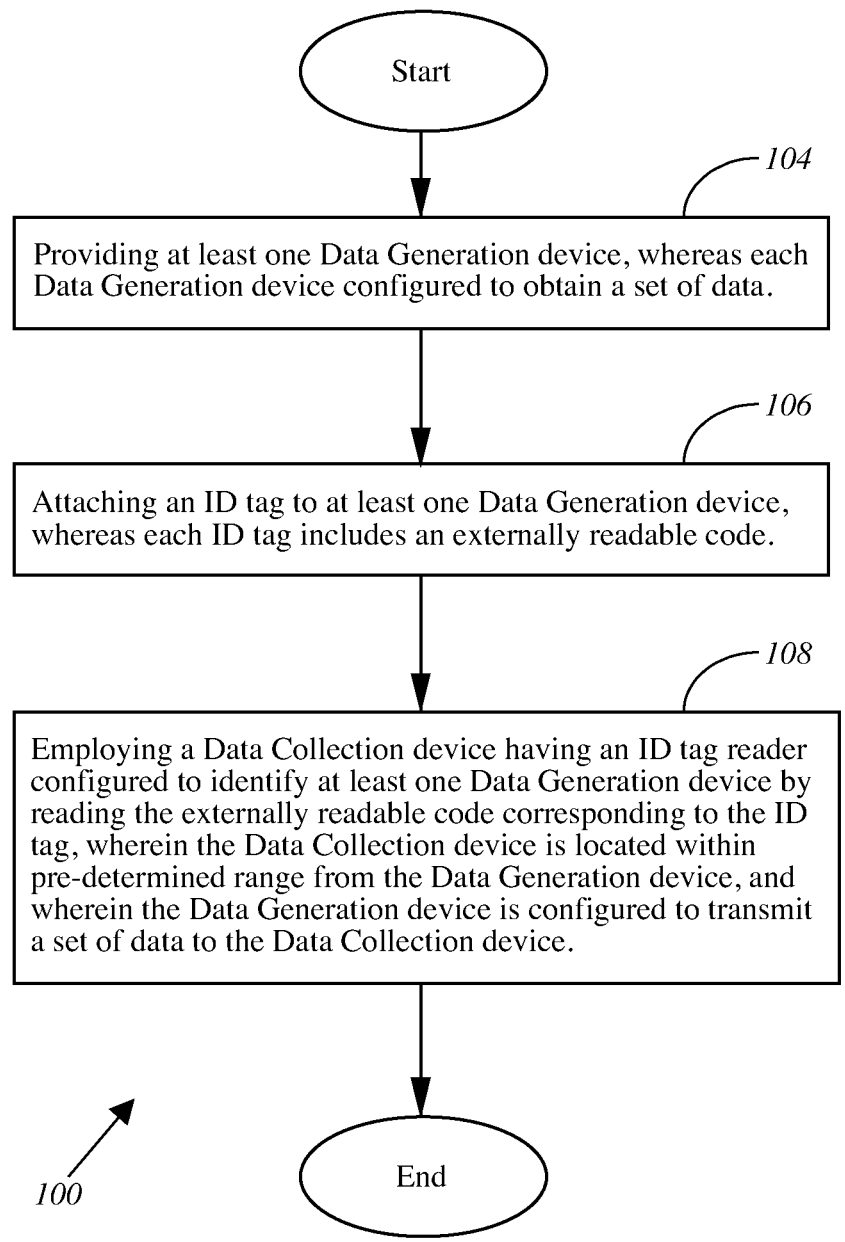
FIG. 2 is a flow chart that illustrates a method of the present technology for improving a data collection process.

In an embodiment of the present technology, the operation of the apparatus 10 of FIG. 1 is illustrated by flow chart 100 of FIG. 2.

More specifically, the method for improving a data collection process by using the apparatus 10 comprises the following steps. At step 104 at least one Data Generation device 14 is provided. The Data Generation device 14 is configured to obtain a set of data. As was disclosed above, the Data Generation device 14 is selected from the group consisting of: a GNSS Receiver, a Total Station, a Digital Level, a Laser Level, a construction survey Data Generation device, a mortgage/deed call Data Generation device, an agricultural Data Generation device, a two-man conventional land surveying system, a conventional robotic system, a Real Time Kinematic GNSS system including a stationary Base receiver and a mobile Rover receiver, and a Virtual Reference Station surveying system.

At step 106, the ID tag 16 is attached to at least one Data Generation device 14. Each ID tag 16 includes an externally readable code. As was disclosed above, the ID tag 16 is selected from the group consisting of: an RFID tag, a low power RFID tag, a barcode, an infra-red tag, and an ultra sound tag.

The Data Collection device 28 includes the ID tag reader 25 configured to identify the targeted Data Generation device 14 by reading the externally readable code corresponding to its ID tag 16. At step 108, the Data Collection device 28 is employed to collect the following data from the targeted Data Generation Device 14: a precision of the Data Generation device, an accuracy of the Data Generation device, a warranty data for the Data Generation device, a service record data for the Data Generation device, an adjustment data for the Data Generation device, and a radio type data for the Data Generation device.

Figure 3:
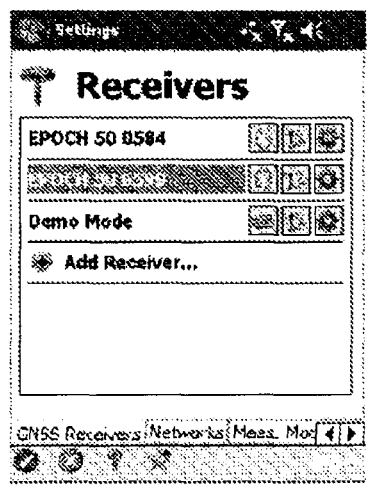
FIG. 3 is a screen shot of the Receivers selection screen.

FIG. 3 clearly illustrates the utility of using the apparatus 10 of present technology. Indeed, even when there are only two receivers to choose from, a tester can still get into trouble.

More generally, among the testing community, a tester would connect to sensors (total stations, GNSS Receivers and digital levels) dozens of times a day—much the same way and end user does. In the past this process was fairly foolproof as every sensor would connect to the Data Collection device via cable—one did not mistake one receiver for another. But the boom in Bluetooth communication has done away with this simplicity and added a new layer of complexity and confusion.

When an operator goes to connect to a Base Receiver, for instance, he should select the correct receiver from a list. Selecting the wrong receiver at setup can mean wasted time as the operator should re-setup the start of the survey.

Figure 4:
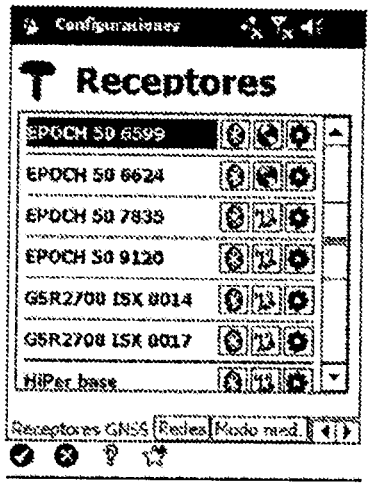
FIG. 4 is a screen shot of the Receptors selection screen.

For a large surveying firm with many crews and dozens of receivers, the confusion can mean a lot of wasted time and money, as illustrated in FIG. 4.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system for data collection comprising:
   a Data Generation device configured to perform surveying measurements of geographical boundaries;
   a tag attached to said Data Generation device; said tag configured to transmit an externally readable code using infra-red signals and to transmit data provided by said Data Generation device using radio frequency signals, the data comprising the surveying measurements of the geographical boundaries;
   and
   a Data Collection device remotely separate from said Data Generation device, said Data Collection device configured for wireless communications with said Data Generation device, said Data Collection device having a tag reader and a wireless transceiver, wherein said tag reader is configured to identify said Data Generation device by receiving said infra-red signals from said tag and identifying said externally readable code; and wherein said wireless transceiver is configured to receive said data from said at least one Data Generation device by receiving said radio frequency signals from said tag.

2. The system of claim 1, wherein said Data Generation device is selected from the group consisting of:
   a Total Station; a Digital Level; and a Laser Level.

3. The system of claim 1, wherein said Data Generation device is selected from the group consisting of:
   a construction survey Data Generation device; a mortgage/deed call Data Generation device; and an agricultural Data Generation device.

4. The system of claim 1, wherein said Data Generation device is selected from the group consisting of:
   a two-man conventional land surveying system; a conventional robotic system; a Real Time Kinematic GNSS system including a stationary Base receiver and a mobile Rover receiver; and a Virtual Reference Station surveying system.

5. The system of claim 1 further comprising:
   a platform; wherein said Data Generation device is placed on said platform; wherein said platform is selected from the group consisting of:
   a Base platform; and a Rover platform.

6. The system of claim 1, wherein said tag includes said externally readable code selected from the group consisting of:
   an infrared code; an infrared code transmitted on a specific frequency periodically; and an infrared code transmitted on a specific frequency aperiodically.

7. The system of claim 1 further comprising:
   a Data Generation database configured to store a set of internal data related to said Data Generation device having said externally readable code.

8. The system of claim 7, wherein said Data Collection device further comprises:
   a memory block configured to store an access code to said Data Generation database.

9. The system of claim 1, wherein said Data Collection device further comprises:
   an Infrared tag reader.

10. The system of claim 1, wherein said Data Collection device further comprises:
    a wireless transmitter configured to wirelessly access Internet to post said data received from said mobile Data Generation device.

* * * * *